United States Patent [19]

Matthews, III

[11] Patent Number: 5,654,748

[45] Date of Patent: Aug. 5, 1997

[54] INTERACTIVE PROGRAM IDENTIFICATION SYSTEM

[75] Inventor: Joseph H. Matthews, III, Redmond, Wash.

[73] Assignee: Microsoft Corporation, Redmond, Wash.

[21] Appl. No.: 435,978

[22] Filed: May 5, 1995

[51] Int. Cl.$^6$ .................................................. H04N 7/173
[52] U.S. Cl. .............................. 348/13; 348/12; 348/564; 455/4.2; 455/5.1
[58] Field of Search ........................ 348/6, 7, 12, 13, 348/906, 468, 554, 563, 564; 455/4.2, 5.1, 6.1; H04N 7/16, 7/173, 5/445

[56] References Cited

U.S. PATENT DOCUMENTS

| | | |
|---|---|---|
| 3,845,391 | 10/1974 | Crosby . |
| 4,706,121 | 11/1987 | Young . |
| 4,893,248 | 1/1990 | Pitts et al. ................................. 348/1 |
| 5,038,211 | 8/1991 | Hallenbeck . |
| 5,047,867 | 9/1991 | Strubbe et al. .......................... 348/564 |
| 5,063,610 | 11/1991 | Alwadish . |
| 5,253,066 | 10/1993 | Vogel . |
| 5,301,028 | 4/1994 | Banker et al. . |
| 5,343,300 | 8/1994 | Hennig .................................... 348/478 |
| 5,353,121 | 10/1994 | Young et al. ............................ 348/563 |

FOREIGN PATENT DOCUMENTS

| | | | |
|---|---|---|---|
| 2232031 | 11/1990 | United Kingdom ........... | H04N 5/445 |
| 9501057 | 1/1995 | WIPO ............................. | H04N 7/16 |

Primary Examiner—John K. Peng
Assistant Examiner—Chris Grant
Attorney, Agent, or Firm—Klarquist Sparkman Campbell Leigh & Whinston, LLP

[57] ABSTRACT

A program identification system is provided to inform a user of an interactive viewing system of the identity of a program being viewed. The system may be implemented in an interactive television system in which a head end in two-way communication with multiple viewer stations provides a variety of programs over different channels to each viewer station. The programs may be video-based programs, computer executed applications, or other types of programs. Each viewer station can query the head end to learn the identity of a program, regardless of type, being viewed. The identity is then displayed to the user. Additional program specific information can also be obtained and displayed.

12 Claims, 4 Drawing Sheets

INTERACTIVE PROGRAM IDENTIFICATION SYSTEM

BACKGROUND OF THE INVENTION

1. Field of the Invention

The present invention relates to a system for informing a user of an interactive viewing system what program is being viewed and for providing the user information about that program.

2. Description of Related Art

As communication technology continues to expand, individuals are faced with an ever increasing number of information sources. For example, many cable television services offer dozens of different channels from which a user can choose. Some available satellite claim to offer hundreds of channels and it is widely expected that cable services will expand in an effort to match or exceed this capability. Similar gains in the quantity of available programs and services are anticipated in areas of communication other than television.

With so many program choices, a user may frequently be unable to identify a program simply by viewing it. This can be frustrating, because many users select programs by stepping through channels to identify available programs. This practice, sometimes called "channel surfing", is most effective if the various programs can be quickly and accurately identified. If the programs cannot be readily identified or if the programs are misidentified, the user's program selection process is impaired and the user may miss part or all of a desired program. The process of identifying programs simply by viewing them is further complicated by commercials or other interruptions that may be showing at the time a particular channel is viewed.

In some cases, a user refer to various printed or on-line program guides to identify programs. However, printed program guides may not always be readily available to a user and on-line program guides typically do not allow the user to concurrently watch programs and are often time consuming and frustrating to use. For these and other reasons, many users prefer to select programs by channel surfing.

SUMMARY OF THE INVENTION

Accordingly, it is an object of the present invention to provide a system that informs a user of an interactive viewing system what program is being viewed and allows the user quickly and easily to obtain a program's identity and other information about the program while the program is being viewed.

A system in accordance with a preferred embodiment of the present invention is integrated into an interactive viewing system. The interactive viewing system typically includes a central head end in bidirectional communication with one or more viewer stations. Each viewer station has an interactive station controller, a video display operably coupled to the interactive station controller and an input device for providing user input to the interactive station controller. The head end makes available to the viewer stations a number of programs at different times and on different channels. The head end further includes information about the programs it provides.

In a preferred embodiment of the present invention, each time a user changes channels the system displays an identification panel that contains, at least, the title of the program being viewed. Preferably, the identification panel is displayed on the video display in a manner that does not unduly obstruct the program being viewed. The information displayed in the identification panel is obtained upon request of the interactive station controller from the head end.

In another aspect of the invention, the user can display the identification panel on demand by entering an appropriate command using the input device.

In another aspect of the invention, the interactive station controller can request from the head end additional information about the currently viewed program. The user can preferably cause the additional information to be displayed in an information panel on the video display by entering an additional command using the input device.

Other objects and aspects of the invention will become apparent to those skilled in the art from the detailed description of the invention which is presented by way of example and not as a limitation of the present invention.

DESCRIPTION OF THE ILLUSTRATED EMBODIMENT

Figure 1:
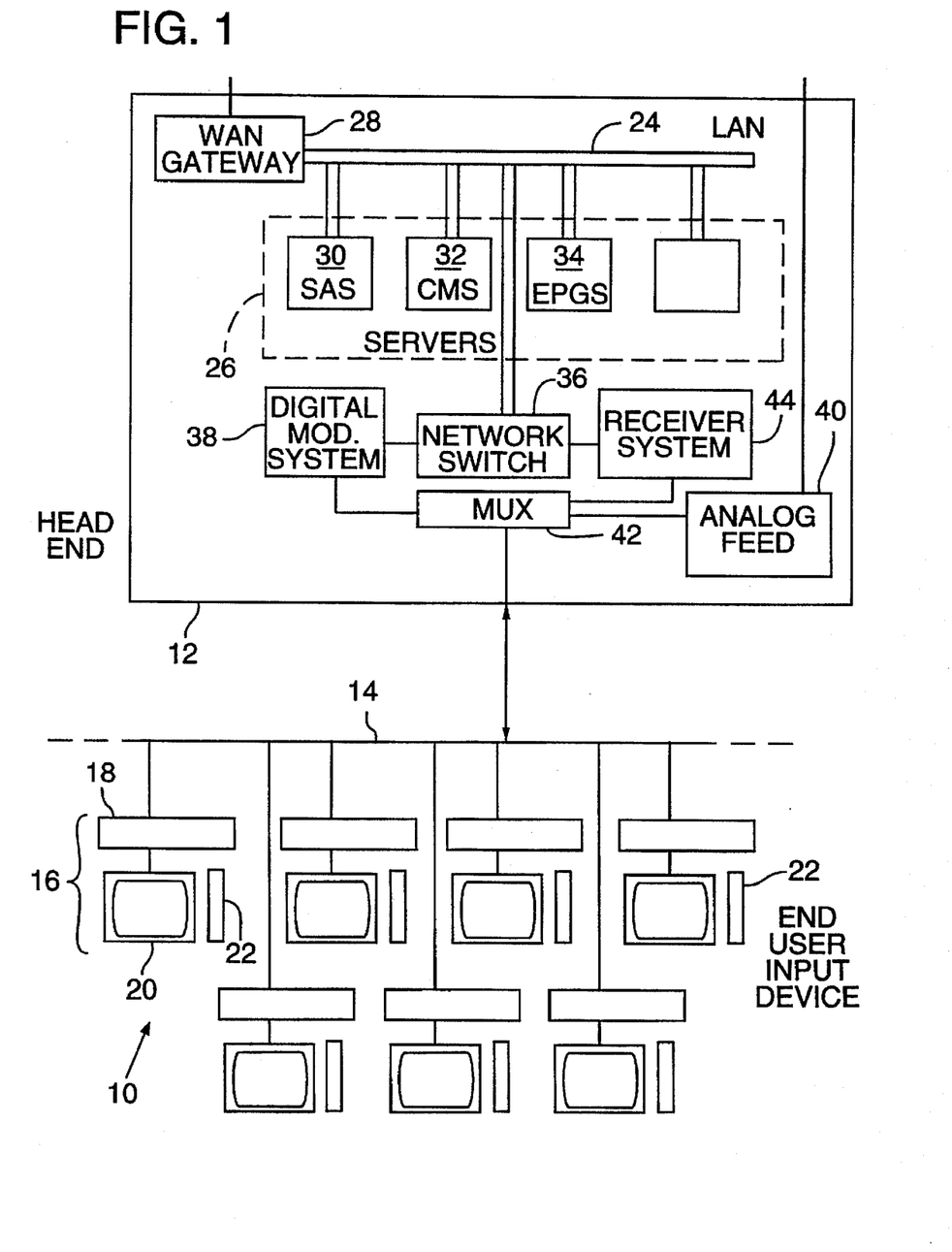
FIG. 1 is a block diagram of an interactive viewing system incorporating a preferred embodiment of the present invention.

A simple block diagram of an exemplary interactive viewing system 10 that provides an operating environment for a preferred version of the present interactive program identification system is illustrated in FIG. 1. The interactive viewing system 10, which is an interactive television system in the illustration, has a central head end 12 that supplies programming over a network 14 to multiple viewer stations 16 that are typically located in the homes of system users or subscribers. Each viewer station typically includes an interactive station controller 18, a video display 20, and a user input device 22. The viewer stations 16 accept user input and can, in addition to receiving programming from the head end 12, transmit information back to the head end. In this manner, the interactive viewing system 10, allows for independent two-way communication between the head end 12 and each of the viewer stations 16.

As shown in FIG. 1, the head end 12 of the illustrated interactive viewing system includes a digital local area network (LAN) 24 that includes multiple computer servers 26 for performing various interactive system applications or functions and a digital communication gateway 28 to a wide area network (WAN) (not shown). The servers 26, which store and process information at the head end, may include, for example, service and application servers 30, continuous media servers 32, and electronic program guide data servers 34.

The service and application servers 30 process interactive service requests from subscribers and provide services and applications associated with network security, monitoring, object storage, financial transactions, data access, and other administrative functions. The continuous media servers 32 provide storage and on-demand or near on-demand delivery of digitized video information. The digitized video information can include video programming of substantially any duration ranging from individual image frames and brief video clips to full-length motion pictures.

The electronic program guide data server 34 stores program schedule information. For example, the program schedule information may include a program schedule database that identifies what program is available on a given channel at a given time. The program schedule information may also contain additional information about any particular program, such as, a brief description of the program, the stars of the program, a link to a video preview (stored on the continuous media server 32) for the program, whether the program is closed captioned, whether the program is stereo or a variety of other information. Such information is commercially available, for example, from Tribune Media Services or TV Data, both of Glens Falls, N.Y. Preferably, such information is delivered to the head end 12 via a digital communication gateway 28 and an associated wide area network.

As used here, the servers 26 may include various types of memories for storing information and various types of processors for processing information. Various functions of the servers described here may be combined so as to be carried out by a single server or may be divided and allocated among more than one server. Moreover, there may likely be a variety of functions and services carried out by the servers 26 which are not described here.

The servers 26 communicate with the viewer stations 16 via a network communication switch 36, such as an asynchronous transfer mode (ATM) switch. For communication from the servers 26 to the viewer stations 16, the network communication switch 36 arranges digital information from the servers 26 in a standard bidirectional digital communication format for transmission over the network 14. For communication from the viewer stations 16 to the servers 26, the network communication switch 36 converts digital information from a standard bidirectional digital communication format for delivery to the servers 26.

In the exemplary system illustrated in FIG. 1, digital information from the servers 26 is frequency modulated by a digital modulator system 38 for transmission over the network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequency range, may be modulated at frequencies between the standard analog frequencies, or may be modulated at frequencies above the standard analog frequencies.

The head end 12 may be provided with analog signals through an analog feed 40. The analog signals provided to the head end may be standard analog video signals for conventional cablecast of television programs or other analog information. A multiplexing system 42 receives and mixes the frequency modulated digital information from the digital modulator system 38 and analog signals obtained from the analog feed 40 and delivers a composite signal to the interactive network 14 where it is made available to viewer stations 16. A reverse channel receiver system 44 receives and demodulates communications from the viewer stations 16 for processing by the servers 26.

Preferably, the network 14 carries such bidirectional communication between the viewer stations 16 and the head end 12. Alternatively, communication between the viewer stations 16 and the head end 12 can be carried by different communication systems. For example, communication from the head end 12 to the viewer stations 16 could be carried on a satellite downlink while communication in the other direction is carried on a terrestrial modem link.

Figure 2:
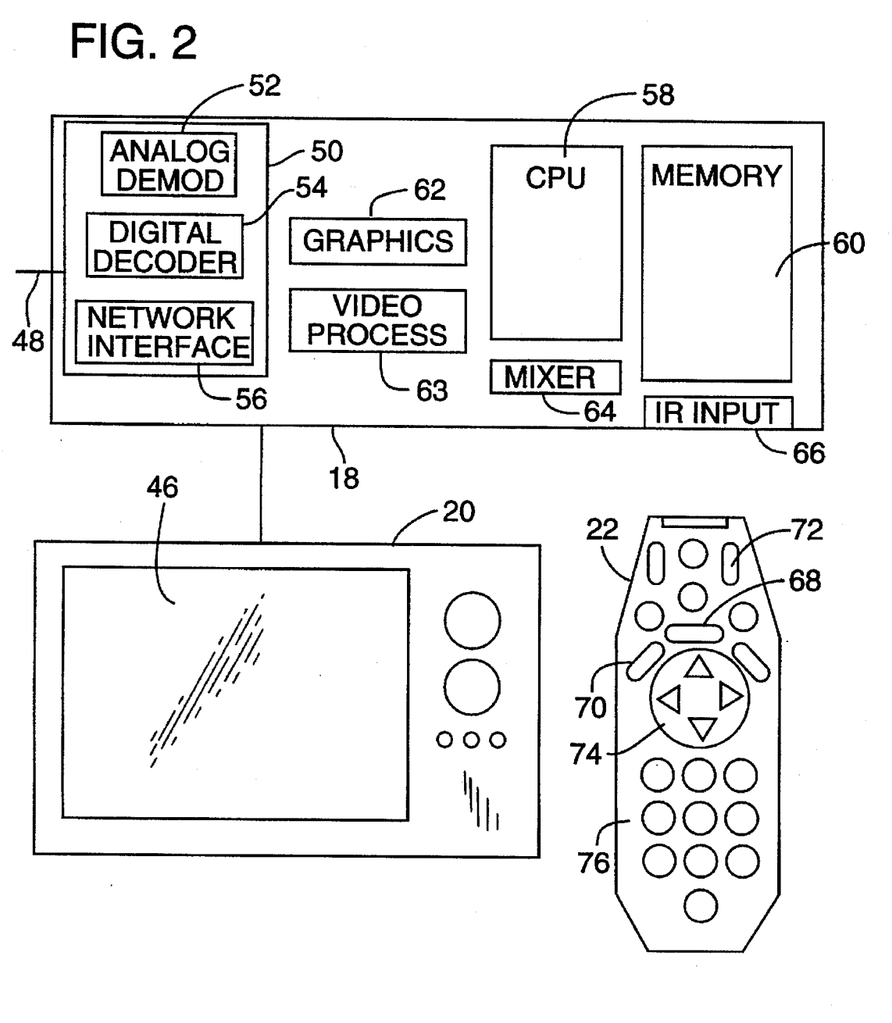
FIG. 2 is a block diagram of a viewer station as illustrated in FIG. 1.

A simplified block diagram of an exemplary viewer station 16 is illustrated in FIG. 2. The illustrated viewer station includes an interactive station controller 18 which is sometimes referred to as a set top box, at least one video display 20 such as a television, and an input device 22 such as an infrared remote control. Although it is shown distinct from video display 20, the interactive station controller 18 could alternatively be integral with the video display 20.

The interactive station controller 18 controls the video display 20 and communicates with the head end 12. Controlling the video display 20 of a conventional analog type may include, for example, delivering an analog video signal directly to the video display 20 for display on a screen 46, converting a digital video signal to a suitable analog form for display, generating a video signal for display, or executing an application that includes displays on video display 20.

The interactive station controller 18 includes an input 48 from network 14 that delivers communications or information from the central head end 12 to a communication interpretation system 50 having, for example, an analog television demodulator 52, a digital video decoder 54, and a digital network communication interface 56. The demodulator 52 functions as a conventional television tuner for selecting one or more of multiple conventional analog video signals present at input 48. The video decoder 54 functions as a digital equivalent of demodulator 50 for selecting one or more of multiple digital video signals present at input 48. The network communication interface 56 communicates with digital information.

A central processing unit (CPU) 58 in conjunction with a memory system 60 controls operation of the interactive station controller 18. For example, the CPU 58 controls selection of analog-based programming, digital-based programming or applications delivered from the head end 12, accesses or activates selected applications, or delivers information to or requests information from the head end 12.

The interactive station controller 18 also may include a graphics subsystem 62 that is controlled by the CPU 58 to form graphics images, including user interface displays, on the video display 20. A video processor subsystem 63, also controlled by the CPU 58, provides control in generating and displaying video images. A mixer 64 receives the programming or applications signals received from the central head end 12 or CPU 58, graphics image signals from graphics subsystem 62, and video image signals from the video processor subsystem 63 and delivers a mixed image signal to video display set 20. As used here, mixing may include compositing, blending and masking of images sources such as a digital video, analog video, locally generated graphics and various overlays and bitmap images.

The interactive station controller 18 also includes an infrared receiver and decoder system 66 that receives user input from the user input device 22 and delivers the input to the CPU 58. The input device 22 can be used by a user of the interactive viewer system 10 to input commands. The input device 22 is provided with a number of keys which may be pressed by a user to input commands. Based upon the keys pressed by a user, the input device 22 generates and emits infrared signals. These signals are detected by the infrared receiver and decoder system 66 of the interactive station controller 18, decoded, and provided to the CPU 58. The commands may be processed by the interactive station controller 18, may be communicated to the head end 12 for processing, or a combination of both. In the example system illustrated in FIG. 2, the input device 22 is a hand-held infrared remote control.

The illustrated input device includes at least a menu key 68, an action key 70, a channel up/down key 72, and a numeric keypad 76. The uses and functions of these keys are described further below.

In operation, the interactive viewing system 10 allows a user to select from among a variety of programs available at any given time. These programs are not limited to conventional video-based television programs and may include computer executed applications and the like. The system makes both video-based programs and computer executed applications available to a user over a number of different "channels." The user can select from among the various program choices, regardless of program type, by selecting the channel of the desired program.

As used here, the term channel is not limited to traditional broadcast or cablecast television channels. Rather, each of the various program choices, including computer executed applications, is assigned a channel. For example, one program option might be a video game. Although the game is a computer executed application that may be executed either by the CPU 58 or by processors at the head end 12, it is assigned a channel number. A user wishing to play the video game could access the game by turning to the assigned channel. Thus, turning to a particular channel may involve tuning to a particular frequency to receive a conventional video signal (either analog or digital), launching a computer executed application, or some other action associated with that particular channel.

Figure 3:
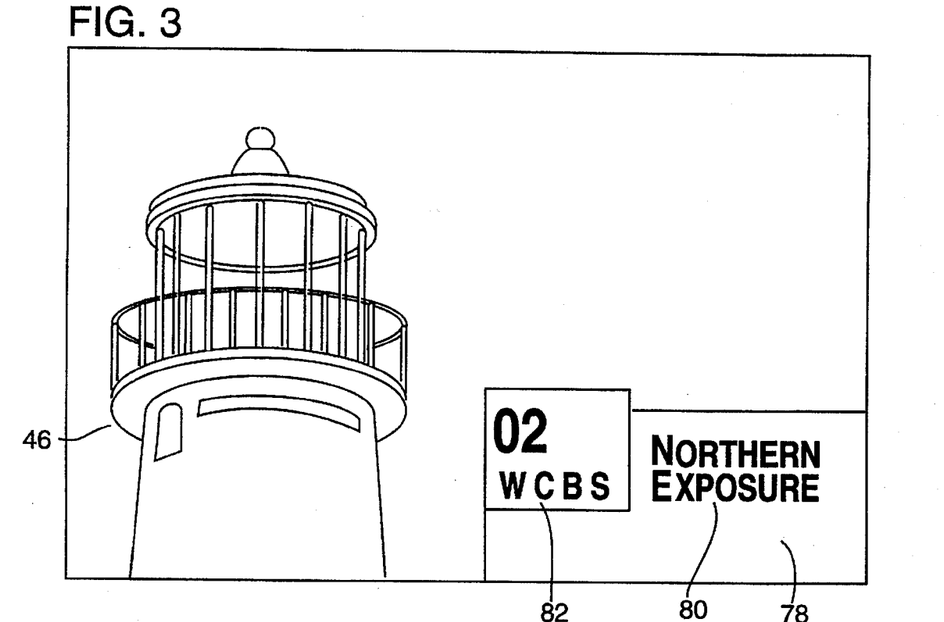
FIG. 3 illustrates the screen of the video display on which a sample of a preferred identification panel is shown.

To inform the user of the interactive viewing system 10 of the identity of the program being viewed, which may be a video-based program, a computer executed application, or some other type of program, the system can display an identification panel 78, illustrated in FIG. 3. The identification panel preferably includes the title 80 of the program being viewed and an identification of the channel 82 which is being viewed. The identification of the channel may include the channel number, a channel logo, and the channel name or call letters. The identification panel may also display additional information such as the current time, the time remaining in the program being viewed, the time elapsed in the program being viewed or some other brief information.

In the illustrated embodiment, the identification panel 78 is displayed over the ongoing program in the lower right hand corner of the screen 46 of the video display. Preferably, it does not significantly obstruct the viewer's vision of the central portion of the screen 46. To further reduce obstruction of the ongoing program, the identification panel 78 may be translucent.

Figure 5:
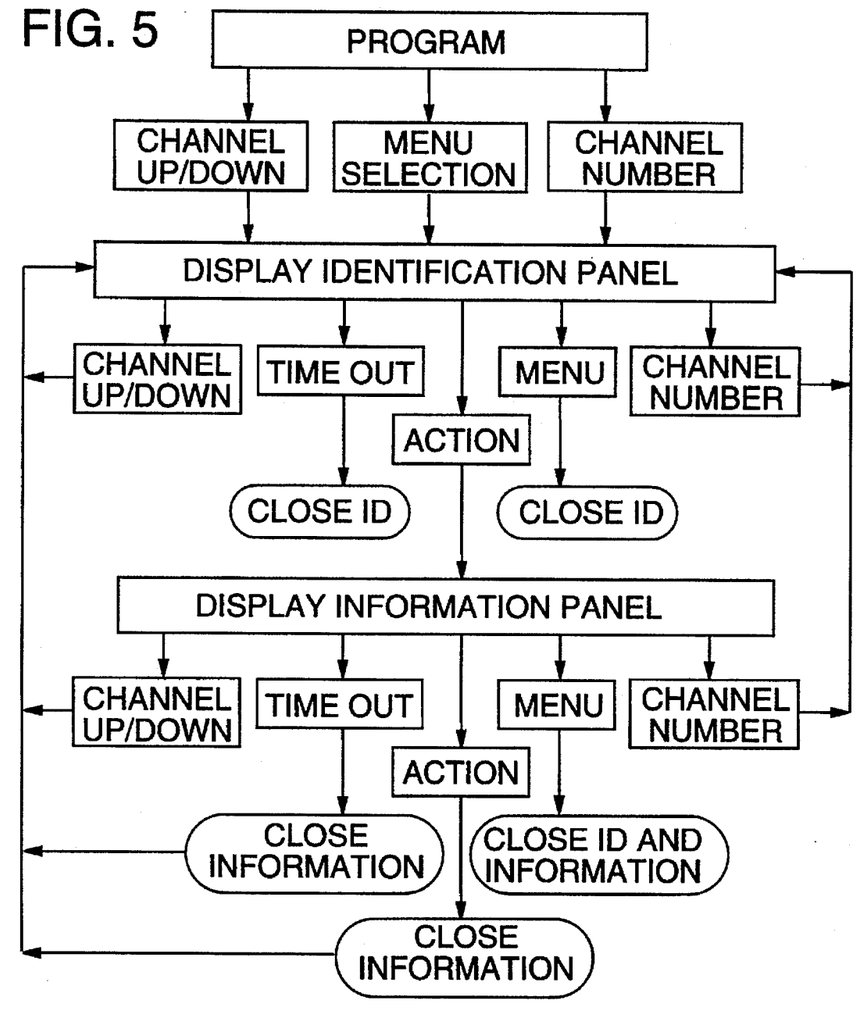
FIG. 5 is a schematic diagram illustrating operation of a program identification system in accordance with a preferred embodiment of the present invention.

As illustrated in the schematic of FIG. 5, a viewer viewing a program can cause the display of the identification panel 78 by changing a channel, either by entering a channel number using the numeric keypad 76 or by using the channel up/down key 72, or by selecting the identification panel from a system menu displayed in response to the user pressing the menu key 68. Of course, in other embodiments, different events might cause the display of the identification panel.

To display the identification panel, the CPU 58 obtains program schedule information from the head end 12. The program schedule information may be obtained as needed from the head end 12. Alternatively, the CPU 58 could periodically, for example every half hour, request program schedule information for all channels and store that information in the memory system 60. The stored program schedule information could then be used in creating the identification panel. To access the program schedule information, the CPU 58 monitors the user's current channel selection and the current time. With this information, the CPU 58 can query the program schedule information to determine the identity of the program that is currently being viewed by the user. The CPU 58 controls the graphics subsystem 62 to generate the identification panel for display on the screen 46.

To monitor the current channel, the CPU 58 determines the initial channel setting when the user begins a viewing session. The initial channel may be the last channel viewed during the prior viewing session. In which case the channel number can be stored in the memory system and retrieved upon the initiation of a new viewing session. Alternatively, the system may begin each viewing session with a predetermined default channel setting. A viewer can change the current channel by entering a channel number for another available channel using the numeric keypad 76 or by using the channel up/down key 72 to step up or down to the next available channel.

However, not all channel numbers are offered on all systems. Similarly, a user might not be authorized to view all channels offered by a system. Thus, the CPU 58 uses a channel map to assist in keeping track of the current channel number. Preferably the channel map for each user is maintained at the head end 12 and may be obtained on demand by the CPU 58 and stored in the memory system 60. The channel map is a user specific list of all channels available to the user. In this sense, a channel is available to a user if it is offered by the system and the user is authorized to view the channel. The CPU 58 refers to the channel map to determine whether a channel number entered by a user is an available channel and to determine how to increment or decrement the current channel number in response to a user pressing the channel up/down key.

For example, assume that a particular user's channel map includes only channels 2, 5 and 7 and that the current channel for that user is channel 5. If the user entered channel 3 using the numeric keypad, the CPU 58 would check the channel map and determine that channel three was not an available channel. Thus, the current channel setting would remain at channel 5. Similarly, if the user steps up one channel using the channel up/down key, the CPU would check the channel map and determine that the next higher available channel is channel 7. Thus, the CPU would increment the current channel to channel 7. Likewise, if the user stepped down one channel from channel 5, the current channel setting would become channel 2, the next lower available channel from the channel map.

Once the identification panel 78 is displayed, the system will automatically remove it from the screen 46 after a predetermined mount of time passes with no additional user input. In the illustrated embodiment, the time-out period is five minutes if the identification panel was selected from the menu. Otherwise, the time-out period is three seconds.

As indicated in FIG. 5, if the user enters a new channel number using the numeric keypad 76 or navigates to a new channel using the channel up/down key 72, the identification panel is updated to identify the program on the newly selected channel. The time-out period is reset when the identification panel is updated.

In a preferred embodiment, the identification panel is updated as channel numbers are entered to inform a user of the program currently available on the channel having the entered number. For example, assume that with the identification panel displayed, a user enters channel fourteen using the numeric keypad. The user first presses the digit "1" using the numeric keypad. Following that entry, the identification panel is updated to display the identity of the program available on channel 1. The user next presses the digit "4" and the identification panel is updated to display the program available on channel fourteen. To actually change to channel fourteen, the user could press the action button. Alternatively, if the system only offers channels with two or fewer digits, the system could be "intelligent" and turn to a channel after the entry of the second digit. Preferably, there is a slight delay, for example one second, between the entry of the last digit and actually turning to the new channel.

If the menu key 68 is pressed with the identification panel displayed, the system closes the identification panel and displays a system menu (not shown). The system will then monitor and implement a user's menu selection.

Figure 4:
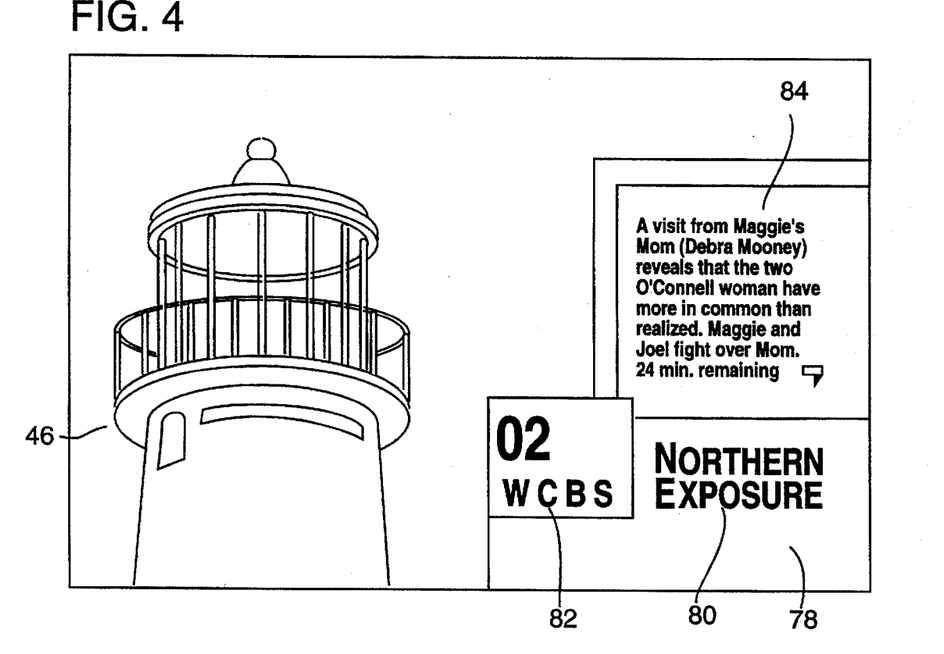
FIG. 4 illustrates the screen of the video display on which a sample of a preferred information panel is shown.

A user can obtain additional information about the currently viewed program by pressing the action key 70 while the identification panel 78 is displayed. As indicated in FIG. 5, this will cause the system to display an information panel 84 above the identification panel 78. An example of a preferred version of the information panel 84 displayed on the screen 46 is illustrated in FIG. 4. The information panel 84 contains additional, detailed, information about the program being viewed. Preferably, the information is episode specific in the case of a conventional television program.

The information panel 84 is generated in much the same manner as the identification panel 78. However, it is preferable that the detailed program information be obtained from the head end 12 at the request of the CPU 58 at the time the user opens the information panel. This conserves space within the memory system 60.

As with the identification panel 78, the information panel will automatically close after a time-out period elapses unless the user enters another command. The identification panel, however, remains open when the information panel closes after a time-out period elapses. The preferred time-out for the information panel is the same as the identification panel. If the user changes the channel, either with the numeric keypad 76 or the channel up/down key 72, the information panel 84 and the identification panel 78 are each updated, as described above, to display information for the program on the newly selected channel. Pressing the menu key 68 will close both the identification panel 78 and the information panel 84 and display a system menu. Pressing the action key 70 with the information panel 84 open will close the information panel 84 and return to the identification panel.

The illustrated program identification system greatly simplifies the process of program identification. Each time the user changes the channel, the system automatically identifies the program on the new channel. In addition, pressing a single key while the identification panel is displayed provides the user with detailed information about the program being viewed. This ready access to program information will greatly assist a user to make informed program selections.

As can be appreciated, the preferred identification panel will accurately identify a program even during commercial breaks or other interruptions. The accuracy of program identification is further enhanced because the program schedule information used to identify the program can be obtained on demand from the head end. Thus, any last minute schedule changes can be reflected in the identification panel.

For purposes of simplicity, the interactive viewing system 10 which serves as an operating environment for the current program identification system has been described with reference to widely available systems and standards, including conventional analog television receivers and cable-based video networks. It should also be appreciated, however, that the particular components of the interactive viewing system 10 may be implemented in accordance with a variety of conventions, standards, or technologies and still provide a suitable environment for implementation of the underlying concepts of the present invention. For example, the conventional analog television receivers and cable-based video network illustrated in FIG. 1 could be implemented as digital video receivers and a satellite downlink transmission system, respectively. Likewise, the cable-based network could be an electrically conductive cable network, an optically conductive cable network, some other network technology, or a combination of these technologies.

It should also be realized that the programming provided by the head end 12 is not limited to traditional television programs. Rather, the programming may include standard analog video signals (e.g., NTSC, PAL or SECAM), digital video signals (e.g., MPEG1 or MPEG2), digital information related to computer-executed applications, or other types of programming. In addition, an interactive program identification system in accordance with the current invention may be implemented in environments other than the interactive television system described here.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

What is claimed is:

1. In an interactive viewing system having a head end in two-way communication with multiple viewer stations having a video display operatively coupled to a controller, the head end providing to the multiple viewer stations programming comprising a plurality of programs provided on a plurality of channels, a method for identifying one of said plurality of programs being viewed by a user of one of said viewer stations, the method comprising the steps of:

storing program information identifying which one of said plurality of programs is provided by the head end over each of the plurality of channels at a given time, the program information being stored at the head end;

monitoring the channel being viewed by the user to identify a current channel;

accessing, in response to a user command, the program information stored at the head end to identify a viewed program provided on the current channel at the current time; and displaying the identity of the viewed program on the video display.

2. The method of claim 1 further comprising the steps of:

storing descriptive information about each of said plurality of programs;

accessing the descriptive information to obtain a description of the viewed program;

displaying the description of the viewed program on the video display.

3. The method of claim 2 in which the descriptive information is stored at the head end and accessed from the head end by the controller in response to a user command.

4. The method of claim 1 wherein the user command is a command to change the channel.

5. The method of claim 4 further comprising the step of removing the identity of the viewed program from the video display after a predetermined time has elapsed.

6. In an interactive viewing system having a head end in two-way communication with multiple viewer stations having a video display operatively coupled to a controller, the head end providing to the multiple viewer stations programming comprising a plurality of programs provided on a plurality of channels, a method for identifying one of the plurality of programs being viewed by a user of one of the viewer stations, the method comprising the steps of:

storing program information identifying which one of said plurality of programs is provided by the head end over each of the plurality of channels at a given time, the program information being stored at the head end;

storing descriptive information about each of said plurality of programs, the descriptive information being stored at the head end;

monitoring the channel being viewed by the user to identify a current channel;

accessing the program information from the head end in response to a user command to identify a viewed program provided on the current channel at the current time;

displaying the identity of the viewed program on the video display;

accessing the descriptive information from the head end in response to a user command to obtain a description of the viewed program; and displaying the description of the viewed program on the video display.

7. The method of claim 6 further comprising the step of displaying the current channel on the video display with the identity of the viewed program.

8. In an interactive viewing system having a head end in two-way communication with multiple viewer stations having a video display operatively coupled to a controller, the head end providing to the multiple viewer stations programming comprising a plurality of programs provided on a plurality of channels, a system for identifying to a user viewing one of the plurality of programs on one of the viewer stations the identity of the viewed program, the system comprising:

first memory located at the head end for storing program information that identifies which one of the plurality of programs is available on each of the plurality of channels at any given time, wherein the controller monitors a user's channel selections to identify a current channel and obtains from the first memory at the head end, in response to a user command, the identity of a viewed program based upon the current channel and the current time; and a display panel visible on a screen of the video display, the display panel being generated by the controller and containing the identity of the viewed program and the current channel.

9. The system of claim 8 in which the display panel is located in the lower right hand corner of the screen.

10. The system of claim 8 further comprising a second memory and a channel map stored in the second memory, the channel map identifying channels available to the user, wherein the controller limits the current channel to channels identified in the channel map.

11. In an interactive viewing system having a head end in two-way communication with multiple viewer stations having a video display operatively coupled to a controller, the head end providing to the multiple viewer stations programming comprising a plurality of programs provided on a plurality of channels, a method for identifying one of the plurality of programs being viewed by a user of one of the viewer stations, the method comprising the steps of:

storing at the head end program information identifying which one of said plurality of programs is provided by the head end over each of the plurality of channels at a given time;

receiving a user command to change to a user selected channel;

accessing the program information at the head end to identify a program currently provided on the user selected channel; and displaying the identity of the program on the video display.

12. The method of claim 11 further comprising the step of removing the display of the identity of the viewed program from the video display after a predetermined time period has elapsed.

* * * * *

(12) EX PARTE REEXAMINATION CERTIFICATE (8800th)
United States Patent
Matthews, III (10) Number: US 5,654,748 C1
(45) Certificate Issued: Jan. 17, 2012

(54) INTERACTIVE PROGRAM IDENTIFICATION SYSTEM

(75) Inventor: Joseph H. Matthews, III, Redmond, WA (US)

(73) Assignee: Microsoft Corporation, Redmond, WA (US)

Reexamination Request:
No. 90/011,540, Mar. 7, 2011

Reexamination Certificate for:
Patent No.: 5,654,748
Issued: Aug. 5, 1997
Appl. No.: 08/435,978
Filed: May 5, 1995

(51) Int. Cl.
*H04N 5/445* (2006.01)
*H04N 7/088* (2006.01)
*H04N 7/173* (2006.01)
*H04N 7/087* (2006.01)

(52) U.S. Cl. ............... 725/14; 348/564; 348/E5.104; 348/E7.036; 348/E7.069; 348/E7.076; 725/116; 725/43

(58) Field of Classification Search ............... 348/13
See application file for complete search history.

(56) References Cited

To view the complete listing of prior art documents cited during the proceeding for Reexamination Control Number 90/011,540, please refer to the USPTO's public Patent Application Information Retrieval (PAIR) system under the Display References tab.

*Primary Examiner* — Joshua Campbell (57) ABSTRACT

A program identification system is provided to inform a user of an interactive viewing system of the identity of a program being viewed. The system may be implemented in an interactive television system in which a head end in two-way communication with multiple viewer stations provides a variety of programs over different channels to each viewer station. The programs may be video-based programs, computer executed applications, or other types of programs. Each viewer station can query the head end to learn the identity of a program, regardless of type, being viewed. The identity is then displayed to the user. Additional program specific information can also be obtained and displayed.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *